(12) United States Patent
Kusunose et al.

(10) Patent No.: US 11,320,204 B2
(45) Date of Patent: May 3, 2022

(54) CONTINUOUS CONCENTRATE FEEDING EQUIPMENT

(71) Applicant: MITSUBISHI MATERIALS CORPORATION, Tokyo (JP)

(72) Inventors: Kenta Kusunose, Surabaya (ID); Masakazu Kitani, Surabaya (ID); Yosuke Unno, Saitama (JP); Dadang Sundana, Gresik (ID); Ahmad Munib Fikry, Gresik (ID); Heri Budi Nurwibowo, Surabaya (ID)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/417,544

(22) PCT Filed: Aug. 6, 2020

(86) PCT No.: PCT/JP2020/030235
§ 371 (c)(1),
(2) Date: Jun. 23, 2021

(87) PCT Pub. No.: WO2021/029326
PCT Pub. Date: Feb. 18, 2021

(65) Prior Publication Data
US 2022/0049898 A1 Feb. 17, 2022

(30) Foreign Application Priority Data
Aug. 9, 2019 (JP) .............................. JP2019-147581

(51) Int. Cl.
*F27D 3/18* (2006.01)
*F27D 3/00* (2006.01)
(Continued)

(52) U.S. Cl.
CPC ........... *F27D 3/0026* (2013.01); *B65G 53/04* (2013.01); *B65G 53/4691* (2013.01);
(Continued)

(58) Field of Classification Search
CPC ........ F23K 3/02; F23K 2203/201; F27D 3/18; F27D 2003/185
(Continued)

(56) References Cited

U.S. PATENT DOCUMENTS 3,689,045 A * 9/1972 Coulter .................. C21B 5/003
266/82
3,994,701 A * 11/1976 Schweimanns ............ C10J 3/50
406/175
(Continued)

FOREIGN PATENT DOCUMENTS

JP  58-037870 Y2  8/1983
JP  05-272875 A  10/1993
(Continued)

OTHER PUBLICATIONS

International Search Report dated Nov. 2, 2020, issued for PCT/JP2020/030235 and English translation thereof.

*Primary Examiner* — Joseph A Dillon, Jr.
(74) *Attorney, Agent, or Firm* — Locke Lord LLP

(57) ABSTRACT

A continuous concentrate feeding equipment of the present invention, which can supply the concentrate to a smelting furnace continuously when the concentrate is received, includes a pressure-adjusting tank that temporarily accumulates granular concentrate; a lift tank that receives the concentrate from the pressure-adjusting tank and discharges the concentrate to a smelting furnace; an air passage for introducing compressed air into the pressure-adjusting tank and the lift tank, respectively; and control means for controlling the compressed air, and the concentrate is continu- (Continued)

ously supplied from the lift tank to the smelting furnace even when the lift tank receives the concentrate from the pressure-adjusting tank by the control means.

4 Claims, 2 Drawing Sheets

(51) Int. Cl.
    *F27B 3/18*     (2006.01)
    *B65G 53/46*     (2006.01)
    *B65G 53/66*     (2006.01)
    *B65G 53/04*     (2006.01)

(52) U.S. Cl.
    CPC ............... *B65G 53/66* (2013.01); *F27B 3/18* (2013.01); *F27D 3/0033* (2013.01)

(58) Field of Classification Search
    USPC .................. 414/171, 196; 110/288, 300
    See application file for complete search history.

(56) References Cited

U.S. PATENT DOCUMENTS

| | | | | |
|---|---|---|---|---|
| 4,040,910 | A * | 8/1977 | Knappstein | C10B 31/04 414/163 |
| 4,389,244 | A * | 6/1983 | Yaroshevsky | C21B 5/003 266/182 |
| 4,482,275 | A * | 11/1984 | Shinozaki | C21B 5/003 406/12 |
| 4,570,552 | A * | 2/1986 | Rachner | F23K 3/02 110/347 |
| 4,582,454 | A * | 4/1986 | Brandenburg | C21B 5/003 406/32 |
| 4,758,118 | A * | 7/1988 | Rachner | C21B 5/003 406/24 |
| 5,285,735 | A * | 2/1994 | Motoi | F23K 3/02 110/101 CB |
| 5,478,172 | A * | 12/1995 | Oura | B01F 15/00194 406/23 |
| 6,287,056 | B1 * | 9/2001 | Szikszay | B65G 53/12 406/127 |
| 6,447,215 | B1 * | 9/2002 | Wellmar | B65G 53/66 406/11 |
| 6,994,497 | B1 * | 2/2006 | Eriksson | B01J 8/0005 406/124 |
| 7,494,615 | B2 * | 2/2009 | Burke | C21B 13/0013 266/225 |
| 7,841,807 | B2 * | 11/2010 | Naunheimer | B01J 8/008 406/197 |
| 7,841,808 | B2 * | 11/2010 | Naunheimer | C10G 25/06 406/197 |
| 7,874,769 | B2 * | 1/2011 | Naunheimer | B01J 8/003 406/197 |
| 7,878,736 | B2 * | 2/2011 | Naunheimer | B01J 8/003 406/192 |
| 7,878,737 | B2 * | 2/2011 | Naunheimer | B01J 8/003 406/192 |
| 7,887,264 | B2 * | 2/2011 | Naunheimer | B01J 8/003 406/192 |
| 8,075,227 | B2 * | 12/2011 | Yuan | B01J 8/003 406/93 |
| 8,858,123 | B2 * | 10/2014 | Schmit | F23K 3/02 406/24 |
| 8,899,884 | B2 * | 12/2014 | Kretschmer | C10J 3/723 406/10 |
| 9,096,732 | B2 * | 8/2015 | Nogi | C08J 3/075 |
| 9,296,570 | B2 * | 3/2016 | Shimono | B65G 53/40 |
| 9,573,775 | B2 * | 2/2017 | Shimono | C21B 5/008 |
| 9,631,869 | B2 * | 4/2017 | Shimono | G01G 11/086 |
| 9,637,325 | B2 * | 5/2017 | Albin | B01J 8/003 |
| 9,637,696 | B2 * | 5/2017 | Stevenson | C10J 3/723 |
| 9,939,152 | B2 * | 4/2018 | Hannemann | F23K 3/02 |
| 9,982,889 | B2 * | 5/2018 | Rath | B65G 53/528 |
| 10,000,347 | B2 * | 6/2018 | Newton | B65G 53/4616 |
| 10,151,014 | B2 * | 12/2018 | Pilote | F27D 3/0025 |
| 10,472,689 | B2 * | 11/2019 | Schott | C21B 5/001 |
| 11,162,733 | B2 * | 11/2021 | Hayton | B08B 9/0328 |
| 2007/0074643 | A1 * | 4/2007 | Tietze | F23K 3/02 110/101 R |
| 2007/0079554 | A1 * | 4/2007 | Schingnitz | C10J 3/845 48/210 |
| 2010/0126068 | A1 * | 5/2010 | Schingnitz | C10J 3/78 48/101 |
| 2010/0284768 | A1 * | 11/2010 | Olin-nunez | C03B 5/235 414/161 |
| 2010/0316472 | A1 * | 12/2010 | Hilgraf | F27B 1/10 414/296 |
| 2013/0305972 | A1 * | 11/2013 | Chen | F23K 1/04 110/342 |
| 2016/0272438 | A1 * | 9/2016 | Brewster | B65G 53/66 |
| 2016/0312321 | A1 * | 10/2016 | Dry | C22B 34/1263 |
| 2021/0331880 | A1 * | 10/2021 | Kusunose | B65G 65/40 |

FOREIGN PATENT DOCUMENTS

JP      H07-011313 A      1/1995
JP      07-023738 U      5/1995

* cited by examiner

CONTINUOUS CONCENTRATE FEEDING EQUIPMENT

TECHNICAL FIELD

The present invention relates to a continuous concentrate feeding equipment capable of continuously supplying granular concentrate to a smelting furnace without interruption even when a granular material is received in non-ferrous smelting or the like.

Priority is claimed on Japanese Patent Application No. 2019-147581, filed Aug. 9, 2019, the content of which is incorporated herein by reference.

BACKGROUND ART

In non-ferrous smelting and the like, an concentrate supply device described in Patent Literature 1 is known as a device that supplies granular concentrate to a smelting furnace. This device includes a service tank that temporarily stores powdery concentrate carried in by a flow conveyor or the like and a lift tank located below the service tank, and has a structure in which the concentrate accumulated in the service tank is fed into the lift tank, and when a certain amount of concentrate is accumulated in the lift tank, compressed air is introduced into the lift tank to feed the concentrate in the tank to the smelting furnace together with the compressed air and the concentrate is blown into a bath through a lance in the furnace.

In such a device, when the concentrate is fed into the lift tank from the service tank, it is necessary to release the internal pressure of the lift tank to the atmospheric pressure such that the concentrate is received in the lift tank. Therefore, since the compressed air for transporting the concentrate introduced into the lift tank must be temporarily stopped and the conveyance of the concentrate sent to the smelting furnace is interrupted, the concentrate cannot be continuously supplied and the concentrate is conveyed in batches into the furnace.

In this way, since the supply of concentrate to the lift tank and the conveyance of concentrate from the lift tank to the smelting furnace are repeated for each batch, the percentage of the time required for processing one batch to the time for concentrate to be transported (hereinafter, mining rate) remains at about 40% to 70%, which is inefficient. Since the lift tank transports concentrate at an upper limit of the instantaneous conveyance capacity, a batch operation cannot completely eliminate the time needed to stop the conveyance and it is difficult to increase the amount of concentrate transported to the smelting furnace any further. Additionally, in the short term, it is difficult to balance the amount of concentrate transported into the furnace and the amount of oxygen blown into the furnace, which causes fluctuations in the bath temperature and draft in the smelting furnace.

Since the tip of the lance is located on the melting bath in the smelting furnace, heating proceeds when the concentrate, which acts as a cold material for the lance, is not transported. This causes the melting loss of the tip part of the lance, and it is necessary to replenish a lance of a predetermined length on a regular basis. Additionally, erosion of a refractory constituting the smelting furnace by a molten metal bath is an important factor for determining the life of the furnace body, and the higher the bath temperature, the shorter the life of the furnace body. In particular, erosion of a hearth refractory directly under the lance and a side wall refractory in the vicinity of a molten metal bath interface is a major factor in determining the furnace repair cycle of the smelting furnace. An exhaust gas generated from the smelting furnace needs to be suctioned by an exhaust gas treatment facility in the subsequent stage such that the draft in the furnace is always kept at negative pressure. For this reason, it is necessary to excessively suction the exhaust gas by the amount of the fluctuation of the draft.

CITATION LIST

Patent Literature

Patent Literature 1

Japanese Unexamined Patent Application, First Publication No. Hei 5-272875

SUMMARY OF INVENTION

Technical Problem

As described above, in the related-art concentrate supply device, it is difficult to increase the amount of concentrate supplied to the smelting furnace because the supply of concentrate to the smelting furnace is intermittent. In addition, there are problems that it is necessary to excessively suction the exhaust gas generated from the smelting furnace in an exhaust gas treatment facility in the subsequent stage and melting loss of the tip part of the lance and erosion of the refractory in the vicinity of the molten metal bath interface in the furnace proceed.

The present invention has been made in view of the above circumstances, and an object thereof is to provide a continuous concentrate feeding equipment capable of continuously supplying concentrate to an concentrate smelting furnace even when the concentrate is received in a lift tank.

Solution to Problem

In order to solve the above problems, the present invention adopts the following means. [1] A continuous concentrate feeding equipment according to one aspect of the present invention includes a pressure-adjusting tank that temporarily accumulates granular concentrate; a lift tank that receives the concentrate from the pressure-adjusting tank and discharges the concentrate to a smelting furnace; an air passage for introducing compressed air into the pressure-adjusting tank and the lift tank, respectively; and pressure control means for controlling the introduction of the compressed air, and the concentrate is continuously supplied from the lift tank even when the lift tank receives the concentrate from the pressure-adjusting tank by the pressure control means.

The term "accumulating concentrate" in the present specification shall include the case of "temporarily accumulating concentrate".

[2] In the continuous concentrate feeding equipment according to the above [1], the air passage may include a first air passage for introducing the compressed air into the pressure-adjusting tank and a second air passage for introducing the compressed air into the lift tank, a pressure-adjusting ventilation passage may be provided to allow the pressure-adjusting tank and the lift tank to communicate with each other, the pressure-adjusting tank may be provided with pressure-adjusting tank control means for temporarily releasing an internal pressure of the pressure-adjusting tank to receive the concentrate, introducing the compressed air after the reception to raise the internal pressure of the pressure-adjusting tank to be higher than an internal pressure of the lift tank, and discharging the concentrate to the lift tank, and the lift tank may be provided with lift tank control means for introducing the compressed air into the lift tank continuously throughout the reception and discharge of the concentrate into and from the lift tank.

[3] In the continuous concentrate feeding equipment according to the above [2], the pressure-adjusting tank control means may include a pressure gauge and a metering gauge that are installed in the pressure-adjusting tank, an opening and closing valve that is provided in an concentrate reception passage of the pressure-adjusting tank, an opening and closing valve that is provided in an concentrate discharge passage that couples the pressure-adjusting tank to the lift tank, a pressure-adjusting valve that is provided in the first air passage, and a pressure-adjusting valve that is provided in the pressure-adjusting ventilation passage that couples the pressure-adjusting tank to the lift tank, and the lift tank control means may include a pressure gauge and a metering gauge that are installed in the lift tank, a pressure-adjusting valve that is provided in the second air passage, and a supply valve that is provided in an concentrate supply passage that couples the lift tank to the smelting furnace.

[4] The continuous concentrate feeding equipment according to any one of the above [1] to [3], may further include a flow conveyor that supplies the concentrate to the pressure-adjusting tank; and an opening and closing valve that is provided in an concentrate reception passage that couples the flow conveyor to the pressure-adjusting tank.

Advantageous Effects of Invention

According to the present invention, it is possible to provide a continuous concentrate feeding equipment capable of continuously supplying the concentrate to the concentrate smelting furnace even when the concentrate is received in the lift tank.

DESCRIPTION OF EMBODIMENTS

Figure 1:
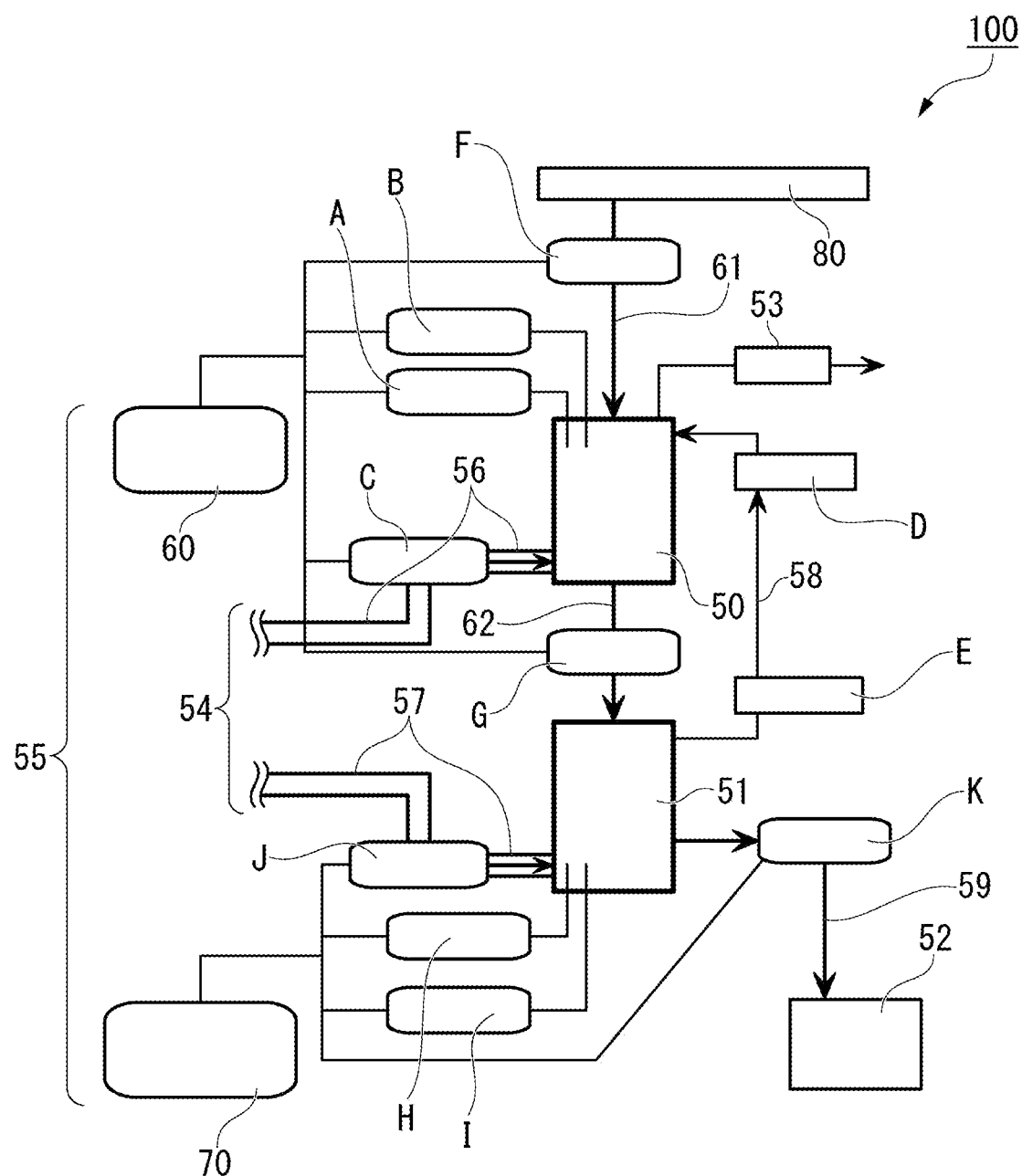
FIG. 1 is a block diagram illustrating the functions of a continuous concentrate feeding equipment according to an embodiment of the present invention.

Hereinafter, a continuous concentrate feeding equipment according to an embodiment to which the present invention is applied will be described in detail with reference to the drawings. In addition, in the drawings used in the following description, in order to facilitate understanding of the features, there is a case where featured portions are illustrated in an enlarged manner for convenience, and the dimensional ratio of each component may not be the same as the actual one. Additionally, the materials, dimensions, and the like exemplified in the following description are examples, and the present invention is not limited thereto. The present invention can be appropriately modified and carried out within a range not changing the gist thereof.

FIG. 1 is a block diagram illustrating main functions of a continuous concentrate feeding equipment 100 according to an embodiment of the present invention. The continuous concentrate feeding equipment 100 mainly includes a pressure-adjusting tank 50, a lift tank 51, an air passage 54, and pressure control means 55.

The air passage 54 includes a first air passage 56 for introducing compressed air into the pressure-adjusting tank 50 and a second air passage 57 for introducing compressed air into the lift tank 51. A pressure-adjusting ventilation passage that allows the two passages to communicate with each other is provided between the pressure-adjusting tank 50 and the lift tank 51.

The pressure control means 55 includes first pressure control means (pressure-adjusting tank control means) 60 that controls the compressed air to be introduced into the pressure-adjusting tank 50 and adjusts the internal pressure of the pressure-adjusting tank 50, and second pressure control means (lift tank control means) 70 that controls the compressed air to be introduced into the lift tank 51 and adjusts the internal pressure of the lift tank 51. The pressure control means 55 may further include a device that automatically controls the functions (outputs) of the first pressure control means 60 and the second pressure control means 70 so that the internal pressure difference between the pressure-adjusting tank 50 and the lift tank 51 is maintained within a predetermined range.

The first pressure control means 60 temporarily releases the internal pressure of the pressure-adjusting tank 50 to receive the concentrate, introduces the compressed air after the reception, raises the internal pressure of the pressure-adjusting tank to be higher than the internal pressure of the lift tank 51, and discharges the concentrate to the lift tank 51.

The second pressure control means 70 introduces compressed air into the lift tank 51 continuously throughout the reception and discharge of the concentrate into and from the lift tank 51.

The pressure-adjusting tank 50 is means (device) for temporarily accumulating granular concentrate supplied from the outside at a predetermined pressure. A first air passage 56 for introducing compressed air for pressure control is connected to the pressure-adjusting tank 50. The first air passage 56 is provided with a pressure-adjusting valve C that adjusts the amount of compressed air introduced.

The first pressure control means 60 is connected to the pressure-adjusting tank 50. By using the first pressure control means 60, it is possible to control the amount of compressed air to be introduced, the timing of introduction, and the like and adjust the internal pressure of the pressure-adjusting tank 50. The first pressure control means 60 mainly includes a pressure gauge A and a metering gauge B installed in the pressure-adjusting tank 50, an opening and closing valve F provided in an concentrate reception passage 61 of the pressure-adjusting tank 50, an opening and closing valve G provided in an concentrate discharge passage 62 that couples the pressure-adjusting tank 50 to the lift tank 51, a pressure-adjusting valve C provided in the first air passage 56, and pressure-adjusting valves D and E provided in a pressure-adjusting ventilation passage 58 that couples the pressure-adjusting tank 50 to the lift tank 51.

An exhaust line for releasing the internal pressure is connected to the pressure-adjusting tank 50, and an exhaust valve 53 is provided in this exhaust line. Additionally, the concentrate reception passage 61 is connected to an upper part of the pressure-adjusting tank 50, and the concentrate reception passage 61 is provided with an opening and closing valve F for receiving the granular concentrate.

The opening and closing operations for the exhaust valve 53, the opening and closing valve F, the pressure-adjusting valve C of the first air passage, the opening and closing valve G of the concentrate discharge passage, and the pressure-adjusting valve D and the pressure-adjusting valve E of the pressure-adjusting ventilation passage are performed such that the pressure in the pressure-adjusting tank 50 is adjusted to a predetermined pressure on the basis of on signals of measurement results of the pressure gauge A and the metering gauge B. The opening and closing operations at this time may be manually performed or may be automated using a computer or the like.

The lift tank 51 is means (device) for temporarily accumulating the concentrate received from the pressure-adjusting tank 50 at a pressure smaller than the pressure adjusted by the pressure-adjusting tank 50 and discharging the concentrate to the smelting furnace at a predetermined timing. The second air passage 57 for introducing the compressed air for pressure control and the compressed air for concentrate transportation are connected to the lift tank 51. The second air passage 57 is provided with a pressure-adjusting valve J for adjusting the amount of compressed air introduced.

The second pressure control means 70 for introducing compressed air into the lift tank 51 to adjust the pressure is connected to the lift tank 51. By using the second pressure control means 70, the amount of compressed air to be introduced, the timing of introduction, and the like can be controlled, and the internal pressure of the lift tank 51 can be adjusted. The second pressure control means 70 mainly includes the pressure gauge H and the metering gauge I installed in the lift tank 51, the pressure-adjusting valve J provided in the second air passage 57, and a supply valve K provided in the concentrate supply passage 59 that couples the lift tank 51 and the smelting furnace 52. The concentrate supply passage 59 is provided with a supply valve K that adjusts the amount of concentrate supplied to the smelting furnace together with the compressed air discharged from the lift tank 51.

The opening and closing operations for the opening and closing valve G, the pressure-adjusting valve J, and the supply valve K are performed such that the pressure inside the lift tank 51 becomes a predetermined pressure on the basis of the signals of the measurement results of the pressure gauge H and the metering gauge I. The opening and closing operations at this time may be manually performed or may be automated using a computer or the like.

It is preferable that the continuous concentrate feeding equipment 100 further includes a flow conveyor 80 as means for carrying in the granular concentrate. The amount of concentrate carried into the pressure-adjusting tank 50 can be adjusted by the opening and closing operation of the opening and closing valve F.

When the concentrate is received by the pressure-adjusting tank 50, the exhaust valve 53 is opened and the inside of the pressure-adjusting tank 50 becomes atmospheric pressure, and the concentrate conveyed by the flow conveyor 80 is supplied to the pressure-adjusting tank 50 via the opening and closing valve F.

In the continuous concentrate feeding equipment 100 in an initial state, the opening and closing valve G that couples the pressure-adjusting tank 50 to the lift tank 51 is closed. When an operation is started and a certain amount of concentrate is accumulated in the pressure-adjusting tank 50, the amount of the concentrate is detected by the metering gauge B, and the exhaust valve 53 is closed by the pressure-adjusting tank control means 60. On the other hand, the pressure-adjusting valve C is opened, compressed air is introduced into the pressure-adjusting tank 50 through the first air passage 56, and the internal pressure of the pressure-adjusting tank 50 is set to be slightly higher than the internal pressure of the lift tank 51. After that, the opening and closing valve G is opened, and the concentrate is supplied to the lift tank 51 through the concentrate discharge passage.

When the lift tank 51 receives the concentrate from the pressure-adjusting tank 50, it is necessary to discharge air having a volume comparable to the amount of the concentrate received from the tank. When the concentrate is discharged from the pressure-adjusting tank 50 to the lift tank 51, the concentrate of the pressure-adjusting tank 50 is easily discharged to the lift tank 51 by opening the pressure-adjusting valves D and E in the pressure-adjusting ventilation passage to allow the internal air of the lift tank 51 to escape to the pressure-adjusting tank 50.

In the lift tank 51, the pressure-adjusting valve J of the second air passage 57 is opened to introduce compressed air, and the amount of the compressed air introduced is such that the internal pressure of the lift tank 51 is kept at a certain pressure equal to or higher than the atmospheric pressure by the pressure gauge H. In this state, the supply valve K of the concentrate supply passage 59 is opened, the concentrate is discharged from the lift tank 51 together with the compressed air, and is fed into the smelting furnace 52 through the concentrate supply passage. In this way, the concentrate is fed into the smelting furnace 52 from the lift tank 51 while the concentrate is being fed from the pressure-adjusting tank 50 to the lift tank 51. In addition, the flow rate of the concentrate can be controlled by adjusting the opening and closing of the pressure-adjusting valve J through the lift tank control means 70.

The amount of concentrate in the lift tank 51 is detected by the metering gauge I, and when the amount of the concentrate decreases to be equal to or less than a reference, the opening and closing valve G is opened through the pressure-adjusting tank control means 60, the concentrate is supplied from the pressure-adjusting tank 50 through the discharge passage to the lift tank 51, and the amount of concentrate in the lift tank 51 is maintained to be equal to or more than a certain amount while the concentrate is conveyed to the smelting furnace 52.

In this way, since the amount of concentrate in the lift tank 51 is maintained to be equal to or more than a certain amount, and compressed air is continuously introduced into the lift tank 51 throughout the time when the concentrate is received into the lift tank 51 and the time when the concentrate is discharged from the lift tank 51, the lift tank 51 can continuously supply the concentrate to the smelting furnace 52 while receiving the concentrate.

[Device Configuration]

Figure 2:
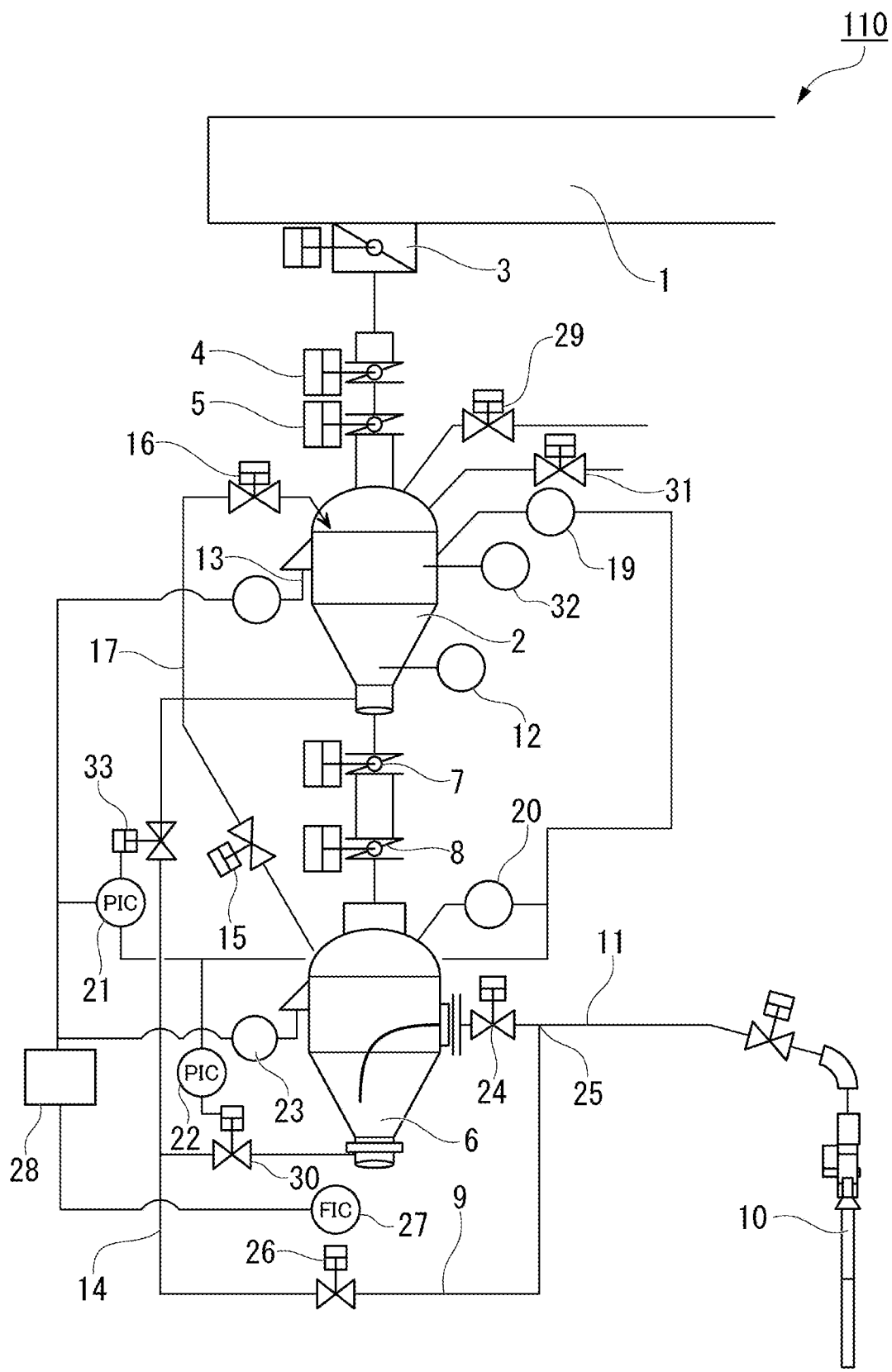
FIG. 2 is a plan view schematically illustrating a configuration of the continuous concentrate feeding equipment according to the embodiment of the present invention.

FIG. 2 is a plan view schematically illustrating a configuration example of a continuous concentrate feeding equipment 110 corresponding to the block diagram of FIG. 1.

The pressure-adjusting tank 2 is provided below the flow conveyor 1, and a damper 3, a charging source valve 4, and a charging valve 5 are provided in the concentrate reception passage that connects the flow conveyor 1 to the pressure-adjusting tank 2. The damper 3, the charging source valve 4, and the charging valve 5 correspond to the opening and closing valve F in FIG. 1. Additionally, the pressure-adjusting tank 2 is provided with limit switches 12 and 32, which detect the amount of concentrate, and a load cell 13. The limit switches 12 and 32 and the load cell 13 correspond to the metering gauge B in FIG. 1. Moreover, the pressure-adjusting tank 2 is provided with a larger exhaust valve 29 and a smaller exhaust valve 31. The larger exhaust valve 29 and the smaller exhaust valve 31 correspond to the exhaust valve 53 in FIG. 1.

The pressure-adjusting tank 2 is provided with a compressed air supply passage 14, the compressed air supply passage 14 is connected to a compressor (not illustrated), and a pipeline of the compressed air supply passage 14 leading to the pressure-adjusting tank 2 is provided with a pressurizing valve 33. The pipeline of the supply passage 14 leading to the pressure-adjusting tank 2 corresponds to the first air passage of FIG. 1, and the pressurizing valve 33 corresponds to the pressure-adjusting valve C.

A lift tank 6 is provided below the pressure-adjusting tank 2, and a charging source valve 7 and a charging valve 8 are provided in an concentrate discharge passage that connects the pressure-adjusting tank 2 to the lift tank 6. The charging source valve 7 and the charging valve 8 correspond to the opening and closing valve G in FIG. 1. The compressed air supply passage 14 is branched and connected to the lift tank 6. The supply passage 14 connected to the lift tank 6 corresponds to the second air passage 57 in FIG. 1.

Additionally, a pressure-equalizing pipe 17 including pressure equalizing valves 15 and 16 is connected to the pressure-adjusting tank 2 and the lift tank 6, and pressure gauges 19 and 20 and pressure setters 21 and 22 are provided in the tanks 2 and 6, respectively. The pressure equalizing valves 15 and 16 correspond to the pressure-adjusting valves D and E in FIG. 1, respectively, and the pressure-equalizing pipe 17 corresponds to the ventilation passage. Additionally, the pressure gauges 19 and 20 correspond to the pressure gauges A and H in FIG. 1, respectively.

An air supply pipe 9 and an concentrate supply passage 11 for transporting concentrate are connected to a lower part of the lift tank 6. The air supply pipe 9 is integrated with the compressed air supply passage 14 and connected to the compressor (not illustrated). The tip of the concentrate supply passage 11 is coupled to a lance 10. The concentrate in the lift tank 6 is sent from the lift tank 6 through the concentrate supply passage 11 and the lance 10 to the smelting furnace by the compressed air introduced through the air supply pipe 9.

The lift tank 6 is provided with a load cell 23 that detects the amount of concentrate charged. The load cell 23 corresponds to the metering gauge 1 in FIG. 1. Additionally, the concentrate supply passage 11 is provided with a transport valve 24, and the concentrate supply passage 11 communicates with the lift tank 6 via the transport valve 24. Additionally, the concentrate supply passage 11 is provided with a branch passage 25, and a booster valve 26 and a flow rate setter 27 are connected in series to the branch passage 25. Moreover, a pressurizing valve 30 is provided in the pipeline of the compressed air supply passage 14 leading to the lift tank 6. The air supply pipes 9, the concentrate supply passages 11, and the compressed air supply passages 14 correspond to the second air passages in FIG. 1. The booster valve 26 and the pressurizing valve 30 correspond to the pressure-adjusting valve J in FIG. 1. The transport valve 24 corresponds to the supply valve K.

The pressure setters 21 and 22 and the flow rate setter 27 are connected to a control device 28. Electric signals indicating the amounts of concentrate and the tank pressures in the pressure-adjusting tank 2 and the lift tank 6 are respectively input to the control device 28, and a control system similar to the pressure-adjusting tank control means 60 illustrated in FIG. 1 for the pressure-adjusting tank 2 is formed by respective devices corresponding to the pressure gauge A, the metering gauge B, the pressure-adjusting valve C, D, and E, and the opening and closing valves F and G that are illustrated in FIG. 1.

Additionally, a control system similar to the lift tank control means 70 illustrated in FIG. 1 for the lift tank 6 is formed by the above devices corresponding to the pressure gauge H, the metering gauge I, the pressure-adjusting valve J, and the supply valve K illustrated in FIG. 1. The pressure setting value and the flow rate setting value of the lift tank 6 are changed on the basis of the electric signals such that the concentrate amount of the lift tank 6 becomes a set amount till the next concentrate reception of the lift tank 6.

[Operating State of Device]

In the device illustrated in FIG. 2, as the larger exhaust valve 29 is closed, the pressure equalizing valves 15 and 16 are opened, and then the charging valve 8 and the charging source valve 7 are opened, the concentrate is discharged from the pressure-adjusting tank 2 to the lift tank 6. When the load cell 13 of the lift tank 6 measures a fixed amount or a timer is counted up, the pressure equalizing valves 15 and 16, the charging valve 8, and the charging source valve 7 are closed, and the discharge of the concentrate to the lift tank is stopped.

Next, the pressurizing valve 30 is opened to raise the internal force of the lift tank 6. After that, after the internal pressure of the lift tank 6 reaches the pressure set by the pressure setter 22, the pressurizing valve 30 is closed to stop the pressurization. After that, the booster valve 26 and the transport valve 24 are opened, and the concentrate of the lift tank 6 is transported toward the lance 10 by compressed air through the concentrate supply passage 11 (transportation step).

When the amount of concentrate in the lift tank 6 decreases and the total weight of remaining concentrate measured by the load cells 13 and 23 provided in the pressure-adjusting tank 2 and the lift tank 6 becomes lower than a set weight, the discharge of the concentrate from the pressure-adjusting tank 2 to the lift tank 6 is prepared.

First, the pressurizing valve 33 is opened to pressurize the pressure-adjusting tank 2 until the pressure of the lift tank 6 measured by the pressure gauge 20 and the pressure difference set in advance by the control device 28, for example, the pressure of the pressure-adjusting tank 2 become slightly higher than the pressure of the lift tank 6 (pressurization step).

Next, the charging valve 8, the charging source valve 7, and the pressure equalizing valves 15 and 16 are opened, and the concentrate is charged from the pressure-adjusting tank 2 into the lift tank 6 (charging step). Therefore, the lift tank 6 can transport the concentrate while receiving the concentrate without requiring the lift tank exhaust step as in the related-art device. When the amount of concentrate is detected by the level gauge 12 of the pressure-adjusting tank 2, the timer is counted up, or when the load cell 13 of the pressure-adjusting tank 2 detects the amount of decrease of concentrate, the pressure equalizing valves 15, 16, the charging valve 8, and the charging source valve 7 are closed to stop the charging of the concentrate (loading stop step).

Next, the smaller exhaust valve 31 and the larger exhaust valve 29 are opened, the internal pressure of the pressure-adjusting tank 2 is released to the atmospheric pressure (exhaust step), and the damper 3, the charging valve 5, and the charging source valve 4 are opened according to the cycle time of the damper 3, and the concentrate conveyed from the flow conveyor 1 is supplied to the pressure-adjusting tank 2 (supply step).

As described above, in the continuous concentrate feeding equipment 100 of the present embodiment, the pressure-adjusting tank 50 capable of adjusting the tank internal pressure is provided upstream of the lift tank 51 instead of the related-art service tank. For that reason, when the concentrate is received, the internal pressure of the pressure-adjusting tank can be temporarily released to receive the concentrate. After the reception, the internal pressure of the pressure-adjusting tank can be made slightly higher than the internal pressure of the lift tank 51 to feed the concentrate to the lift tank 51. Therefore, when the lift tank 51 receives the concentrate, it is not necessary to release the internal pressure of the lift tank 51 to the atmospheric pressure, and the lift tank 51 can continuously supply the concentrate to the smelting furnace while receiving the concentrate. Accordingly, the mining rate can be increased from the related-art 40% to 70% to 100%.

Additionally, in the continuous concentrate feeding equipment 100 of the present embodiment, the concentrate is continuously supplied to the smelting furnace 52 while the lift tank 51 receives the concentrate. For that reason, the balance between the amount of concentrate and the amount of oxygen, which are blown into the smelting furnace 52, is always maintained, and the temperature fluctuation in a molten metal bath and the draft fluctuation in the smelting furnace 52 can be reduced. Therefore, it is possible to reduce the excessive suction amount of the exhaust gas, increase the amount of concentrate conveyed to the smelting furnace 52, and suppress the melting loss of the lance and the erosion of refractories such as a hearth and a furnace side wall.

REFERENCE SIGNS LIST

1 Flow conveyor
2 Pressure-adjusting tank
3 Damper
4 Charging source valve
5 Charging valve
6 Lift tank
7 Charging source valve
8 Charging valve
9 Air supply pipe
10 Lance
11 Concentrate supply passage
12, 32 Limit switch
13 Load cell
14 Compressed air supply passage
15, 16 Pressure equalizing valve
17 Pressure-equalizing pipe
19, 20 Pressure gauge
21, 22 Pressure setter
23 Load cell
24 Transport valve
25 branch passage
26 Booster valve
27 Flow rate setter
28 Control device
29 Larger exhaust valve
30 Pressurizing valve
31 Smaller exhaust valve
33 Pressurizing valve
50 Pressure-adjusting tank
51 Lift tank
52 Smelting furnace
53 Exhaust valve
54 Air passage
55 Pressure control means
56 First air passage
57 Second air passage
58 Pressure-adjusting ventilation passage
59 Concentrate supply passage
60 Pressure-adjusting tank control means
61 Concentrate receiving furnace
62 Concentrate discharge furnace
70 Lift tank control means
80 Conveyor
100, 110 Continuous concentrate feeding equipment.

What is claimed is:

1. A continuous concentrate feeding equipment comprising:
   a pressure-adjusting tank that temporarily accumulates granular concentrate;
   a lift tank that receives the concentrate from the pressure-adjusting tank and discharges the concentrate to a smelting furnace;
   an air passage for introducing compressed air into the pressure-adjusting tank and the lift tank, respectively; and
   pressure control means for controlling the introduction of the compressed air, and
   wherein the concentrate is continuously supplied from the lift tank even when the lift tank receives the concentrate from the pressure-adjusting tank by the pressure control means.

2. The continuous concentrate feeding equipment according to claim 1,
   wherein the air passage includes a first air passage for introducing the compressed air into the pressure-adjusting tank and a second air passage for introducing the compressed air into the lift tank,
   a pressure-adjusting ventilation passage is provided to allow the pressure-adjusting tank and the lift tank to communicate with each other,
   the pressure-adjusting tank is provided with pressure-adjusting tank control means for temporarily releasing an internal pressure of the pressure-adjusting tank to receive the concentrate, introducing the compressed air after the reception to raise the internal pressure of the pressure-adjusting tank to be higher than an internal pressure of the lift tank, and discharging the concentrate to the lift tank, and
   the lift tank is provided with lift tank control means for introducing the compressed air into the lift tank continuously throughout the reception and discharge of the concentrate into and from the lift tank.

3. The continuous concentrate feeding equipment according to claim 2,
   wherein the pressure-adjusting tank control means includes
   a pressure gauge and a metering gauge that are installed in the pressure-adjusting tank,
   an opening and closing valve that is provided in an concentrate reception passage of the pressure-adjusting tank,
   an opening and closing valve that is provided in an concentrate discharge passage that couples the pressure-adjusting tank to the lift tank,
   a pressure-adjusting valve that is provided in the first air passage, and
   a pressure-adjusting valve that is provided in the pressure-adjusting ventilation passage that couples the pressure-adjusting tank to the lift tank, and
   the lift tank control means includes a pressure gauge and a metering gauge that are installed in the lift tank, a pressure-adjusting valve that is provided in the second air passage, and a supply valve that is provided in an concentrate supply passage that couples the lift tank to the smelting furnace.

4. The continuous concentrate feeding equipment according to claim 1, further comprising:

a flow conveyor that supplies the concentrate to the pressure-adjusting tank; and an opening and closing valve that is provided in an concentrate reception passage that couples the flow conveyor to the pressure-adjusting tank.

* * * * *